United States Patent [19]

Ichikawa et al.

[11] Patent Number: 4,615,953
[45] Date of Patent: Oct. 7, 1986

[54] LINING STRUCTURE COMPOSITION FOR A TUNDISH

[75] Inventors: Kenji Ichikawa; Hiroyuki Sugimoto; Ryosuke Nakamura, all of Bizen; Takashi Yamamura, Okayama; Kenji Mitsuhata, Bizen, all of Japan

[73] Assignee: Shinagawa Refractories Co., Ltd., Tokyo, Japan

[21] Appl. No.: 706,163

[22] Filed: Feb. 27, 1985

[30] Foreign Application Priority Data

Feb. 27, 1984 [JP] Japan .................................. 59-34193

[51] Int. Cl.$^4$ .............................................. B32B 9/00
[52] U.S. Cl. ................................ 428/699; 106/38.27; 427/135; 428/701
[58] Field of Search .............................. 428/699, 701; 106/38.27; 427/135

[56] References Cited

U.S. PATENT DOCUMENTS 3,976,823 8/1976 Ernsthausen ........................ 428/701
4,460,916 7/1984 Hashimoto et al. ................. 428/699

OTHER PUBLICATIONS

Shibata et al., "Steelmaking Conference Procedure", vol. 65, 1982, pp. 66–76.
Taniguchi et al., "Taikabutsu Overseas", vol. 1, No. 2, pp. 62–69.
Arai et al., Article delivered at First International Conference on Refractories, Nov. 15–18, 1983, Tokyo, Japan, pp. 709–720.
Nashiwa, "Taikabutsu (Refractories)", vol. 28, pp. 518–522.

Primary Examiner—Lorenzo B. Hayes
Attorney, Agent, or Firm—Wenderoth, Lind & Ponack

[57] ABSTRACT

The present invention provides an improved lining structure composition on the inner surface of a tundish by forming an alumina-silica-base intermediate lining layer over which a magnesian surface coating layer is formed by gunning. It solves the adhesion defect on a refractory lining of the tundish and enables longer operation of the tundish.

1 Claim, 1 Drawing Figure

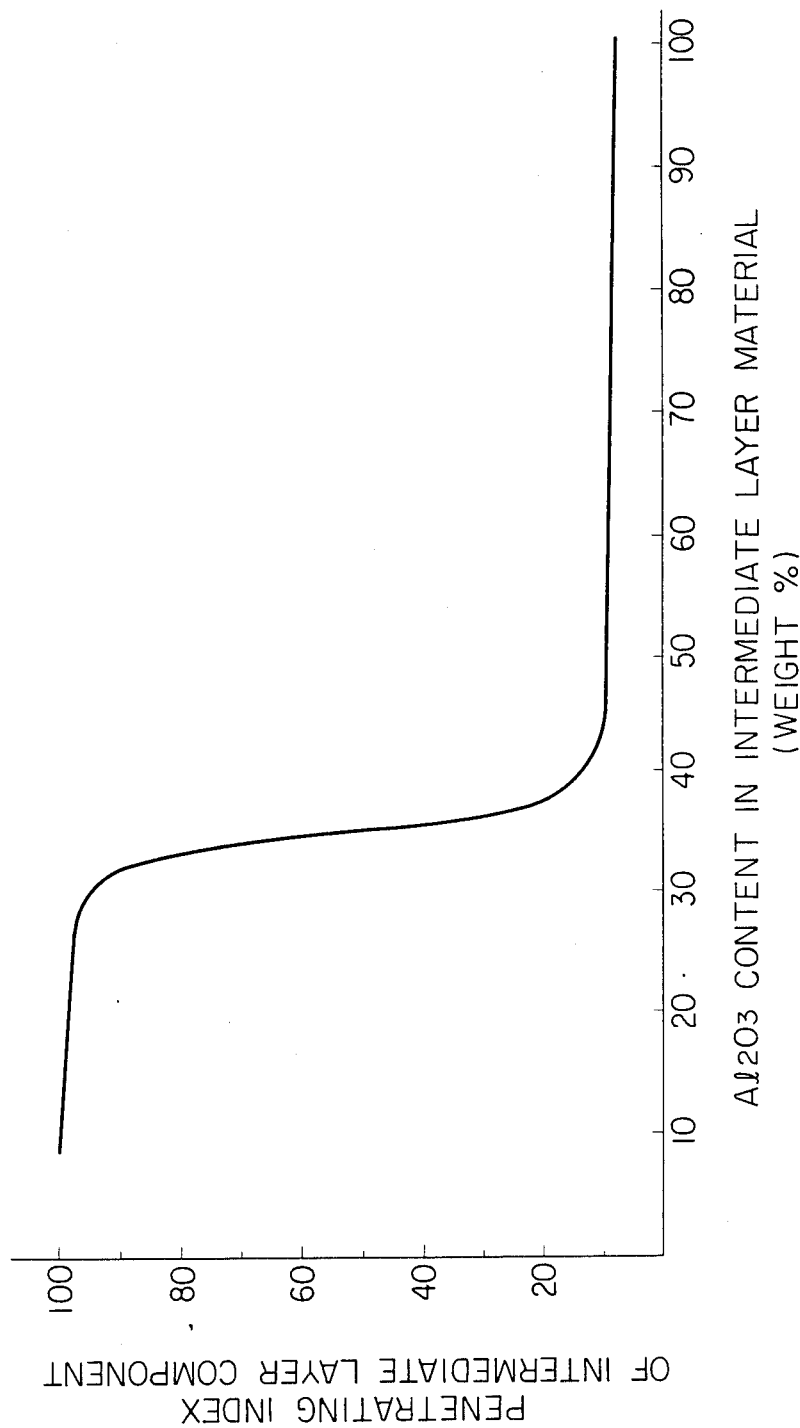

LINING STRUCTURE COMPOSITION FOR A TUNDISH

BACKGROUND OF THE INVENTION

The present invention relates to a lining structure composition for the inner surface of a tundish characterized by forming an alumina-silica base intermediate lining layer on which a layer of a magnesian gunning material is coated.

In the past, the inner surface of a tundish for steel production was usually lined with refractory bricks and/or casting materials made of high silicious, chamotte, alumina, zircon group materials on which a surface coating layer was formed with a trowelling material or a board consisting of a magnesian substance for the purpose of avoiding foreign materials in the steel products.

Application by gunning has recently been developed for the purpose of saving manual labour wherein the same type of magnesian materials are employed as for trowelling or application with boards.

However, the corrosion resistance of a surface coating layer applied by gunning sometimes rapidly deteriorates, the layer partially vanishing, and even the refractory lining under the surface covering layer may also be damaged after operation of a tundish for a long period of time. On the other hand even if the corrosion resistance of the surface coating layer does not deteriorate after long operation of a tundish, the surface coating layer and the refractory lining material beneath it may strongly adhere to each other at the time of taking out residual steel and skull after the operation of a tundish. This adhesion not only makes the removal of residual steel and skull difficult but also makes it necessary to remove the adhered layers, which was unnecessary with a tundish lined with a trowelling material or boards.

When a magnesian board or trowelling material is employed for the surface coating application of a tundish, the above-mentioned problems are not caused. Such inconveniences arise only when a surface coating is formed by gunning application. When a surface coating is applied by gunning, the coating material deeply penetrates into the minute pores and uneven portions of the surface of a refractory lining material, establishing a high bonding strength and strongly adhering to the refractory material.

While this advantageously reduces peeling off of the coating from the lining during the operation of a tundish the adhesion of coated material to the refractory lining is so solid at the operating temperature of the tundish (about 1550° C.), that both materials react easily.

If a refractory surface coating material the same in quality as the refractory lining material is employed, the above-mentioned defect resulting from the reaction can be avoided. However, when an alumina-silica-base or zircon-base material is employed for a surface coating layer, such materials cause contamination in molten steel as Si and/or non-metal inclusions. Magnesia-base material is usually employed for the surface coating layer with the thickness range of 5 to 40 mm to avoid the above problem.

The degree of reaction between a surface coating gunning material and a refractory lining material was inspected by analyzing a piece of surface coating layer after operation of a tundish. As a result, it was found that the $SiO_2$ component increased in a surface coating layer when a high silicious or a chamotte material was used as a refractory lining material. It is thought that when a refractory lining material rich in $SiO_2$ component and a surface coating gunning material comprising magnesian material are exposed at a high temperature during the operation of a tundish, they react, resulting in the migration of $SiO_2$ contained in the refractory lining material into the surface coating layer, and the refractoriness of the surface coating layer is reduced while its corrosion resistance simultaneously deteriorates. On the other hand, when a refractory lining material consists of a medium alumina, a high alumina or zircon material, little migration of components contained in the refractory lining material into the surface coating layer occurs, and it was found that a thin vitreous layer and a recrystallized product are formed on the interface between the surface coating layer and the refractory lining material by the reaction between both materials, and that the surface coating layer and the refractory lining material adhere strongly.

SUMMARY OF THE INVENTION

It is the object of the present invention to provide a lining structure composition for a tundish, which overcomes the above-described drawbacks of prior art lining structures.

After carrying out a variety of attempts, the present inventors have achieved the present invention by forming an intermediate layer comprising materials which have a low reactivity with magnesian gunning materials to form a surface coating layer and which have affinity for the refractory lining materials.

Accordingly, a lining structure for a tundish according to the present invention comprises an improved surface coating layer for a tundish formed by gunning, therein solving the above mentioned problems, i.e., corrosion resistance, deterioration of a coating layer, and adhesion of a surface coating layer and an intermediate refractory lining this is accomplished by forming an alumina-silica intermediate lining containing 35-65% by weight of $Al_2O_3$ on the inner surface of a tundish and further forming a surface coating layer with a magnesian gunning material which shrinks after heating, comprising 70-90% by weight of MgO and 1-20% by weight of CaO, adding one or both of 2-10% by weight of $SiO_2$ and 0.2-4% by weight of $Na_2O$, over the intermediate layer.

BRIEF DESCRIPTION OF THE DRAWING

The sole figure is a graph showing the relationship between the penetrating index of the components in an $Al_2O_3$-$SiO_2$-base intermediate lining layer into a surface coating layer and the $Al_2O_3$ content in the intermediate lining layer.

DETAILED DESCRIPTION OF THE INVENTION

When an intermediate layer consisting of the same $Al_2O_3$-$SiO_2$ material as the refractory lining of a tundish is employed, there is less reacting possibility between the refractory lining material and the intermediate layer. The reactivity between an $Al_2O_3$-$SiO_2$ base material and a magnesian surface coating gunning material will be considered while referring to the drawing.

Various $Al_2O_3$-$SiO_2$ base intermediate linings containing different amounts of alumina were formed. On these surface coating materials containing 85% by weight of magnesia were applied by gunning, employing usual methods. The sole figure shows the change in the components in the surface coating layers after heating of the layers at 1500° C. for 3 hours and cooling. In the drawing, the penetrating index of intermediate layer component indicated on the ordinate axis was computed from a relative penetrated amount of the intermediate layer component (mainly $Al_2O_3$-$SiO_2$) into the surface coating layer measured by a fluoresence X-ray. It can be seen that when a magnesian gunning material is used as a surface coating layer and the amount of alumina in an intermediate lining layer is less than 30% by weight, the components of the intermediate lining layer greatly migrate into the magnesian gunning material. When the amount of alumina in an intermediate lining layer is 35% by weight, the migration of components is reduced to about half of that for below 35% by weight, and it goes down to ⅛ at more than 40% by weight of alumina.

Thus, when a magnesian gunning material is used as a surface coating layer for a tundish, the deterioration of corrosion resistance of a surface coating layer can be restrained, by employing an intermediate lining layer containing at least 35% by weight of $Al_2O_3$-$SiO_2$.

The present inventors found that when an $Al_2O_3$-$SiO_2$ base intermediate lining layer is inserted between a surface coating layer and a refractory lining, the factors most influencing the adhesion between the surface coating layer and the refractory lining are the degree of linear shrinkage of the surface coating layer and the content of alumina in the intermediate lining layer.

An experiment was carried out using materials for the intermediate lining layers containing different amounts of alumina, applying a gunning material containing 82–86% by weight of MgO and varying its degree of linear shrinkage after heating at 1500° C. for 3 hours with a thickness of 25 mm over the surface of the intermediate layer, and heating this sample at 1500° C. for 5 hours. The adhesion between both layers was then observed. The results of the experiment are shown in Table 1.

It is clear from Table 1 that when the degree of linear shrinkage of the gunning material after heating is less than 0.8%, adhesion tends to occur when the alumina content of the intermediate lining layer material is less than 30% by weight. However, when the degree of linear shrinkage of the gunning material after heating is higher than 0.8%, the adhesion can be restrained up to an alumina content of 65% by weight.

A higher degree of linear shrinkage of the surface coating gunning material provides less adhesion with an intermediate lining layer, but in practice, shrinkage degree of at most 7% is suitable. When the degree of linear shrinkage is greater than 7%, undesirable shrinkage cracks are possibly caused due to fluctuations in temperature during the operation of a tundish.

The reason why the degree of linear shrinkage of a magnesian gunning material for a surface coating layer is measured after heating at 1500° C. for 3 hours is because the temperature of molten steel in an actual tundish is about 1550° C., and the temperature at the interface between an intermediate lining layer and a surface coating layer is about 1500° C.

Moreover, the actual average residence time of molten steel in a tundish is about 3 hours. A heating temperature higher than 1500° C. and/or a heating time longer than 3 hours provide a higher sintering and/or a greater degree of linear shrinkage of the surface coating layer.

Accordingly, it is seen in Table 1 that a greater degree of linear shrinkage provides a lower bonding strength of a surface coating layer to an intermediate lining layer, and this fact raises the question as to what range of linear shrinkage should be specified. The above-mentioned condition for determining the shrinking characteristic of a surface coating layer, i.e., 1500° C. for 3 hours has accordingly been chosen based on the actual operating conditions of a tundish, and the limit of shrinking characteristic can easily be determined under this heating condition.

As can be seen from Table 1, the adhering defect of a surface coating layer to an intermediate lining layer containing more than 80% by weight of alumina can be solved by controlling the degree of linear shrinkage after heating of a surface coating layer gunning material. However, in general since the cost of refractory materials containing alumina group materials goes up with an increase in the alumina content, high alumina containing refractories are not economically attractive.

The intermediate lining materials for a tundish of the present invention are non-specific refractory materials applicable by various processes such as by casting, dry vibration molding, gunning, trowelling, or in the form of bricks, sheets, or board. Thus the method of application is not limited.

The appropriate thickness of the intermediate layer depends on the purpose of the lining, the thickness of refractory lining on the metal shell and the point of view of economy. The intermediate layer should generally be within the range of 2~230 mm in practice. When the intermediate layer has a thickness lower than 2 mm, a smooth layer can not be produced due to an uneven surface of the lining under the intermediate layer. At the same time, the corrosion resistance of surface coating layer over the intermediate layer are deteriorated.

In order to apply a layer having a thickness of less than 20 mm, trowelling and spraying are recommended, and the use of bricks, casting, or dry vibration molding are preferable for forming a layer thicker than 20 mm.

The content of magnesia in magnesian gunning material for the surface coating layer must be determined by considering the protection of molten steel from contamination, and an application of magnesian gunning material containing 70-90% by weight of magnesia with a layer thickness of about 5–40 mm is recommended. As such a surface coating material, a material comprising 70–90% by weight of MgO and 1–20% by weight of CaO is well-known. However, in the present invention, to this material is added 2–10% by weight of $SiO_2$ and/or 0.2–4% by weight of $Na_2O$.

In order to provide a degree of shrinkage of 0.8–7% of a magnesian gunning material for a surface coating layer after heating at 1500° C. for 3 hours for example, the amount of the $Na_2O$ component can be adjusted to be within a range of 0.2–4% by weight. The $Na_2O$ component contained in a gunning material containing more than 70% by weight of MgO accelerates sintering. Thus, in the present invention, the degree of shrinkage after sintering can be adjusted by varying the amount of $Na_2O$ in the layer which provides shrinkage.

It is difficult to obtain a degree of linear shrinkage greater than 0.8 when the content of $Na_2O$ is less than 0.2% by weight. On the other hand, if the $Na_2O$ content is higher than 4% by weight the linear shrinkage is greater than 7% which is not desirable.

As a source of Na$_2$O, inorganic sodium salts such as sodium silicate, sodium phosphate, and sodium aluminate, and Na$_2$O-containing minerals like feldspar can be employed.

Alternatively the composition of a surface coating layer may contain 2~10% by weight of SiO$_2$ with 12~50% by weight of the composition being a fine powder smaller than 74μ in diameter. In general, the degree of linear shrinkage increases with an increase in the amount of fine powder in a gunning material. However, when a comparatively high linear shrinkage is required as it is in the present invention, in view of processability and the overall characteristics of the gunning material, the degree of linear shrinkage can not be sufficiently controlled by only the particle size of the powder component. The degree of linear shrinkage is therefore controlled by adding SiO$_2$ which assists the sintering of MgO in a gunning material. When the amount of SiO$_2$ is less than 2% by weight, only a small effect can be expected. On the other hand, more than 10% by weight of SiO$_2$ will undesirably deteriorate the corrosion resistance of the surface coating layer. As a source of SiO$_2$, silicates like alkali silicates, silica sand, silica flour, etc. and magnesia clinker which contains a large amount of SiO$_2$ as an impurity can be suitably employed. As a binder to be added in a gunning material, inorganic binders such as various cements, phosphates, silicates, and organic thermosetting and self-curing binders can be used.

When the lining of a tundish is made of high silicious, chamotte, alumina, or zircon group material, the lining structure composition for a tundish of the present invention can be suitably applied over those linings without any deterioration in corrosion resistance of a surface coating layer or adhering defect. Although there sometimes occurs a very weak chemical reaction between the intermediate lining layer and the refractory lining over the metal shell, the reaction does not affect the surface covering layer.

Occasionally, the lining refractory and the intermediate layer react and the intermediate layer is left on the lining refractory. Even if such adhering occurs, the surface coating layer can be applied over the adhered intermediate layer on the lining refractory, without any deterioration of corrosion resistance and adhesion and the resulting lining structure will perform as well as if it were produced by the formal process of the present invention.

TABLE 1

| Degree of shrinkage of surface coating layer, after heating (%) | Content of alumina in intermediate lining layer (weight %) | | | | | | | | | |
|---|---|---|---|---|---|---|---|---|---|---|
| | 20 | 30 | 40 | 50 | 60 | 65 | 70 | 75 | 80 | 90 |
| 0~0.39 | X | X | Δ | X | X | X | X | X | X | X |
| 0.4~0.79 | Δ | O | Δ | Δ | Δ | X | X | X | Δ | Δ |
| 0.8~1.19 | O | O | O | O | O | O | X | X | Δ | O |
| 1.2~1.59 | O | O | O | O | O | O | X | X | Δ | O |
| 1.6~1.99 | O | O | O | O | O | O | Δ | Δ | O | O |
| 2.0 over | O | O | O | O | O | O | Δ | Δ | O | O |

O: No adhering
Δ: Partially adhering
X: Entirely adhering

The present invention will be further explained by reference to the following examples of a lining structure according to the present invention.

EXAMPLES

Table 2 shows the composition and physical characteristics of 9 examples of a lining structure for a tundish according to the present invention and 4 comparative examples of lining structures according to the prior art.

The rate of erosion of the surface coating layer of the present invention was slow regardless of the length of operation of a tundish for continuous steel casting and no adhering was observed at the time of taking out the residual steel and skull. Thus, the present invention has enabled the highly efficient operation of a tundish.

In contrast, the lining structure of comparative Example 1 shows a high rate of erosion of the surface coating layer after 480 minutes of operation of a tundish, and in comparative examples 2-4, residual steel and skull could hardly be removed due to the adhering between the refractory lining and the surface coating layer.

TABLE 2

| Item | Lining Structure of The Present Invention | | | | | | | | | Lining Structure of Prior Art | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Surface Coating Layer Gunning Material | | | | | | | | | | | | | |
| Chemical Component MgO (weight %) | 89 | 87 | 85 | 84 | 70 | 82 | 87 | 85 | 84 | 85 | 89 | 87 | 87 |
| CaO | 1 | 1 | 2 | 4 | 18 | 2 | 1 | 2 | 4 | 2 | 1 | 1 | 5 |
| SiO₂ | 3 | 1 | 2 | 5 | 9 | 3 | 1 | 6 | 5 | 6 | 3 | 1 | 1 |
| Na₂O | — | 1.4 | 1.0 | 1.8 | 1.2 | 3.8 | 1.4 | 1.0 | 1.8 | 1.0 | — | 1.4 | 0.05 |
| Binder | High Alumina Cement | Sodium hexameta phosphage | Powdered sodium silicate | High Alumina cement | Powdered sodium silicate | Sodium Phosphate sodium silicate | Sodium hexameta phosphate | Powdered medium silicate | High Alumina cement | Powdered sodium silicate | High Alumina cement | Sodium hexamata phosphate | High Alumina cement |
| Particle size - 74μ content (%) | 13 | 28 | 24 | 31 | 45 | 38 | 28 | 24 | 31 | 24 | 13 | 28 | 15 |
| Porosity after heating (%) | 27 | 36 | 32 | 34 | 22 | 41 | 36 | 32 | 34 | 32 | 27 | 36 | 31 |
| Degree of liner shrinkage after heating at 1500° C. for 3 hours (%) | 0.82 | 1.65 | 2.41 | 3.45 | 5.69 | 6.84 | 1.65 | 2.41 | 3.45 | 2.41 | 0.82 | 1.65 | 0.03 |
| Applicating thickness (mm) | 15~20 | 5~7 | 20~25 | 10~15 | 20~25 | 40~45 | 30~35 | 15~20 | 5~7 | 25~30 | 15~20 | 10~15 | 20~25 |
| Intermediate Lining Layer | | | | | | | | | | | | | |
| Type of application | Brick | trowelling | Brick | Spraying | Spraying | Casting | Casting | Sheet | Brick | — | — | — | — |
| Chemical component Al₂O₃ (weight %) | 60 | 37 | 48 | 50 | 64 | 48 | 51 | 60 | 40 | — | — | — | — |
| SiO₂ | 37 | 58 | 46 | 45 | 32 | 45 | 46 | 34 | 56 | — | — | — | — |
| Apparent porosity (%) | 16.0 | 19.5 | 15.5 | 32.5 | 25.0 | 14.0 | 18.5 | 8.5 | 21.0 | — | — | — | — |
| Applicating thickness (mm) | 180 | 5~7 | 230 | 2~4 | 8~10 | 200 | 50 | 3 | 150 | — | — | — | — |
| Lined Refractory | | | | | | | | | | | | | |
| Type of application | Brick | Casting | Brick | Casting | Brick | Brick | Casting | Casting | Brick | Brick | Brick | Casting | Brick |
| Chemical component Al₂O₃ (weight %) | 70 | 20 | 17 | 25 | 17 | 17 | 25 | 20 | 70 | 17 | 70 | 20 | 52 |
| SiO₂ | 27 | 43 | 79 | 71 | 79 | 79 | 71 | 43 | 27 | 79 | 27 | 43 | 44 |
| ZrO₂ | — | 35 | — | — | — | — | — | 35 | — | — | — | 35 | — |
| Apparent porosity (%) | 20.0 | 11.0 | 15.5 | 14.5 | 15.5 | 15.5 | 14.5 | 11.0 | 20.0 | 15.5 | 20.0 | 11.0 | 16.0 |
| Applicating thickness (mm) | 65 | 230 | 30 | 350 | 180 | 30 | 230 | 300 | 150 | 260 | 350 | 180 | 230 |
| Result After Operation of Tundish | | | | | | | | | | | | | |
| Number of times (CH) of continuous steel casting | 4 | 5 | 7 | 11 | 2 | 3 | 3 | 5 | 4 | 6 | 3 | 5 | 4 |
| Operating time (min.) | 180 | 420 | 560 | 880 | 120 | 150 | 150 | 250 | 200 | 480 | 150 | 245 | 180 |
| Corrosion resistance of surface coating layer (Relative corrosion rate) | 1.0 | 1.3 | 1.1 | 1.1 | 1.4 | 1.2 | 1.1 | 0.9 | 1.0 | 4.6 | 1.1 | 1.2 | 1.0 |
| Adhering status between* surface coating layer and intermediate lined layer at the time of taking out residual steel and skull. | no adhering | no adhering | no adhering | no adhering | no adhering | no adhering | no adhering | no adhering | no adhering | no adhering | strong adhering | strong adhering | strong adhering |

*Note:
In the comparative examples 2. through 4. (prior art), adhesion occurs between the surface coating and the lined refractory, due to lack of intermediate lining layer.

What we claim is:

1. A lining for an inner surface of a tundish comprising:
   an intermediate alumina-silica base lining layer containing approximately 35–65% by weight of $Al_2O_3$; and
   a surface coating layer of a magnesian gunning material on top of said intermediate layer, containing approximately 70–90% by weight of MgO, approximately 1–20% by weight of CaO and at leat one member selected from the group consisting of $SiO_2$ and $Na_2O$ in amounts of approximately 2 to 10% by weight and approximately 0.2 to 4% by weight respectively.

* * * * *